US005521000A

United States Patent [19]

Owens

[11] Patent Number: 5,521,000

[45] Date of Patent: May 28, 1996

[54] POLYMER COMPOSITE REED FOR A REED VALVE

[75] Inventor: John N. Owens, Sterling Heights, Mich.

[73] Assignee: General Motors Corporation, Detroit, Mich.

[21] Appl. No.: 387,545

[22] Filed: Feb. 13, 1995

Related U.S. Application Data

[63] Continuation-in-part of Ser. No. 966,662, Oct. 26, 1992, abandoned.

[51] Int. Cl.$^{6}$ .................... B32B 27/04

[52] U.S. Cl. .................... 428/257; 428/258; 428/260; 428/268; 428/290; 123/73 R; 123/73 V; 123/73 A; 123/73 AA; 123/65 V; 123/73 B; 251/358; 251/368; 137/855

[58] Field of Search .................... 428/257, 258, 428/260, 268, 290; 123/73 R, 73 V, 73 A, 73 AA, 65 V, 73 B; 251/358, 368; 137/855

[56] References Cited

U.S. PATENT DOCUMENTS

| | | | |
|---|---|---|---|
| 3,983,900 | 10/1976 | Airhart | 137/855 |
| 4,579,773 | 4/1986 | Cole et al. | 428/260 |
| 4,643,139 | 2/1987 | Hargreaves | 123/65 V |
| 4,696,263 | 9/1987 | Boyeson | 123/65 V |
| 4,879,976 | 11/1989 | Boyeson | 123/65 V |
| 4,892,774 | 1/1990 | Vallance | 428/174 |
| 5,006,402 | 4/1991 | Isayev | 428/294 |
| 5,032,433 | 7/1991 | Isayev et al. | 428/1 |
| 5,037,599 | 8/1991 | Olson | 264/510 |
| 5,264,520 | 11/1993 | Mullins et al. | 528/125 |

FOREIGN PATENT DOCUMENTS

| | | |
|---|---|---|
| 0416831A2 | 3/1991 | European Pat. Off. . |
| 60-110776 | 7/1985 | Japan . |

OTHER PUBLICATIONS

*Patent Abstracts of Japan,* vol. 10, No. 295 (M523), 7 Oct. 1986, Abstract #JP-A-61109977.

*Patent Abstracts of Japan,* vol. 15, No. 513 (M1196), 26 Dec. 1991, Abstract #JP-A-03227207.

*Concise Chemical and Technical Dictionary,* 4th Enlarged Edition, Ed. H. Bennett, Chemical Publishing Co., Inc. New York, p. 1126.

*Primary Examiner*—Marion E. McCamish
*Assistant Examiner*—Kathleen L. Choi
*Attorney, Agent, or Firm*—George A. Grove

[57] ABSTRACT

A polymer composite reed for a reed valve is provided, wherein the reed has improved mechanical properties as a result of its construction and is highly resistant to chemical and thermal attack. The improved mechanical properties of the reed are primarily due to the reed being reinforced with two plies of fabric having a harness satin weave, which provides the reed with a flexural modulus that is substantially greater in one direction of the reed. The chemical and thermal properties are primarily due to the semicrystalline thermoplastic material from which the reed is formed. In addition, the thermoplastic material enhances the fracture toughness of the reed to improve the durability of the reed. As a result, the reed is highly suitable for applications requiring long life under high speed, cyclic loading, such as that found in two-stroke and four-stroke internal combustion engines for the automobile industry.

5 Claims, 4 Drawing Sheets

POLYMER COMPOSITE REED FOR A REED VALVE

CROSS REFERENCE TO RELATED APPLICATIONS

This is a continuation-in-part patent application of U.S. Ser. No. 07/966,662 filed Oct. 26, 1992, now abandoned.

FIELD OF THE INVENTION

The present invention generally relates to reed valves which are suitable for use in two-stroke and four-stroke engine applications. More particularly, this invention relates to a reed valve having an improved reed of the reinforced polymer composite-type which is characterized by suitable fracture toughness, wherein the improvement is attributable to a reinforcing fabric woven throughout the reed and wherein the manner in which the reinforcing fabric is woven improves the flexural properties of the reed.

BACKGROUND OF THE INVENTION

Reed valves are often employed in applications where a fluid is intended to flow in one direction through a passage but not in the opposite direction, much like a check valve. Though automotive applications for reed valves are generally rare, reed valves are commonly used within the intake systems of two-stroke engines, such as those employed for chain saws and motorcycles. Reed valves generally consist of a support structure, such as a housing, containing an aperture which is opened and closed by a resilient member, or reed, attached to the support structure adjacent to the aperture. The support structure is situated within a duct or wall between two chambers, with the aperture serving as the passage therebetween.

Reed valves are operated by the flow of the air/fuel mixture through the passage containing the reed valve. Under certain operating conditions, the particular fluid serves to force the reed against the support structure and thereby close the aperture. Under reverse conditions, the fluid serves to force the reed away from the aperture to permit flow through the aperture. For example, when used in a fuel system, the vacuum created by the combustion chamber deflects the reed away from the aperture to permit the air/fuel mixture to enter the combustion chamber.

In engine applications such as fuel intake systems, the reed must not only be resistant to thermal and chemical attack from the fluids being controlled but must also have sufficient structural integrity to withstand numerous and rapid cycling. In terms of stress, the reed experiences a cantilever bending moment when forced away from the aperture. When forced against the support structure, the reed is generally deflected at its center, being supported at its periphery by the support structure. The forces involved can be significant, requiring the reed to be formed from a strong and durable material.

In the past, reeds have generally been formed from steel. However, steel reeds have two major disadvantages. The first disadvantage is the high density of steel, which results in a heavy reed with a low natural frequency. This yields a slower response to flow reversals and therefore a less effective check valve. While this disadvantage is applicable to both two-stroke and four-stroke applications, it is more serious for four-stroke engines. In two-stroke engines, reed valves are mounted on the crankcase. Crankcases provide a larger volume of air, reducing the, importance of the reed valve having a high natural frequency. However, in four-stroke engines, the trapped air volume between the poppet valve and the reed valve is much smaller, such that fast reed valve response is needed, requiring the reed valve to have a higher natural frequency.

The second major disadvantage is that any failure of a steel reed from fatigue or impact will result in fragments of steel in the intake system. When ingested by the engine, the steel fragments will cause catastrophic damage to the cylinder and pistons, requiring, at the very least, substantial repairs and more often complete replacement of the engine. In addition, such a failure will typically render the engine inoperable, leaving the vehicle stranded.

As a result of these significant shortcomings, polymer composite reeds have recently become common. Polymer composite reeds typically have a fiberglass fabric or weave encased in a thermoset polymer, such as an epoxy resin. As such, polymer composite reeds are significantly less dense than steel reeds. In addition, broken composite reeds can be readily ingested by the engine with no apparent damage. As a result, the failure of a composite reed typically will only result in a slightly rough running engine that is still very drivable. Furthermore, where a composite reed has failed, only the reed must be replaced instead of the entire engine.

Conventionally, the fiberglass mesh (110) is in the form of a "plain weave", which is illustrated in FIGS. 1 and 2. "Plain weave" is defined as a fabric in which each strand, composed of hundreds of individual fiberglass filaments which are twisted or plied together, passes over and under successive transverse strands, one strand at a time, in an alternating fashion. As can be seen in FIG. 1, the appearance of a plain weave fabric 110 is a repetitive pattern of alternating strands. In the plan view illustrated in FIG. 1 and cross-sectionally in FIG. 2, it can be seen that each visible strand running in one direction (such as the strands 114) is "surrounded" by strands (116) running in the transverse direction. The regions 118 denote the epoxy resin used to encase the weaved fabric 110. Plain weave fabrics are typically manufactured with a balanced construction, wherein the number and size of the strands running in one direction are approximately the same as those strands running in the transverse direction. This balanced construction, in combination with the plain weave, yields a final composite which has approximately equal mechanical properties in both directions of the weave.

Conventionally, the suitability of a particular polymer composite material for a composite reed is evaluated in terms of its "flexural modulus." Typically, a composite reed will be tested by flexing a test specimen at its center while being supported at two peripheral points, such as the test method described in ASTM D-790. The flexural modulus indicates the stress-versus-strain relationship of the polymer composite reed material, which serves as an indication of the ability of the reed to open and close under the pressure loading found in its working environment.

With renewed interest in reed valve applications for two-stroke and four-stroke engines in the automotive industry, reed valves are now being required to last significantly longer, corresponding to the typical minimum 100,000 mile durability requirement manufacturers impose for automobiles. As a result, reed valves used in automotive applications must survive many more cycles than previously required in conventional applications such as motorcycles and chain saws. Thus, while suitable for many applications, current polymer composite reeds formed from fiberglass-reinforced thermoset materials tend to be inadequate for automotive applications. A primary reason for this is the inadequate chemical resistance of conventional thermoset composite reeds to automotive fuels, especially methanol and gasoline blends. Another reason is the limited fracture toughness available from thermoset materials.

The flexural modulus of fiberglass-reinforced thermoset reeds is about 20 to about 28 GPa for a typical thickness of about 0.4 millimeters. While such reeds are suitable for conventional applications such as that within the motorcycle industry, they tend to be inadequate for automotive applications which require lighter and faster responding reeds. A lighter reed could be obtained if the thickness of the reed were reduced. However, the natural frequency of a reed, by which the speed of closing is usually rated, is proportional to its thickness according to the equation:

$$f_n = kt(E/\rho)^{1/2}$$

where $f_n$ is natural frequency, k is a constant for a fixed length cantilevered beam, t is the thickness of the reed, E is the flexural modulus and ρ is the reed density. As a result, any reduction in thickness will result in a slower responding reed. In order to compensate for any reduction in thickness, there must be a corresponding increase in the reed's flexural modulus.

Thus, it would be desirable to provide a reed for a reed valve which is suitable for automotive applications in terms of performance capability as defined by the reed's thickness and flexural modulus, and in terms of structural integrity as defined by the reed material's fracture toughness, so as to be able to survive numerous engine cycles without failure.

SUMMARY OF THE INVENTION

It is an object of this invention to provide a reed for a reed valve, wherein the reed is sufficiently resistant to chemical and thermal attack so as to operate within an internal combustion engine, and wherein the reed has mechanical properties which make it suitable for automotive applications.

It is a further object of this invention that such a reed be reinforced with a fabric whose weave enhances the flexural modulus in one direction of the reed so as to enhance the mechanical properties of the reed in that direction.

It is another object of this invention that such a reed be formed from materials which promote fracture toughness so as to promote long life of the reed within the environment of an automotive internal combustion engine.

It is still another object of this invention that the improved flexural modulus of such a reed permit the reed to be made thinner, so as to provide a lighter reed and a faster responding reed valve.

In accordance with a preferred embodiment of this invention, these and other objects and advantages are accomplished as follows.

According to the present invention, there is provided a reed for use within a reed valve which is suitable for automotive internal combustion engine applications. The reed includes one, and more preferably two, reinforcing fabrics which are bonded to, and more preferably, encased within, a semicrystalline thermoplastic which is particularly resistant to the chemical and thermal environment found within an automotive internal combustion engine. Being formed from a semicrystalline thermoplastic, the reed exhibits its better fracture toughness than reeds formed from thermoset polymeric materials, and is more readily able to survive numerous cycles required by an automotive application.

The weave of the fabric differs from that known in the prior art, and has the effect of enhancing the flexural modulus of the reed in one direction of the weave. The fabric has a first set of strands which extend substantially parallel to each other, and a second set of strands which also extend substantially parallel to each other, but are not parallel to the first set of strands. Preferably, the second set of strands are substantially perpendicular to the first set of strands. The first and second set of strands are interwoven with each other such that each strand of the first set passes over a first predetermined number of strands of the second set, and then under a second predetermined number of strands of the second set, in a repetitive manner. The ratio of the first predetermined number to the second predetermined number, i.e., the number of the strands in the second set which are passed over to the number of the strands in the second set which are passed under by a strand from the first set, is greater than one, and more preferably about seven.

With the preferred thermoplastic reinforced by such a fabric, the reed is characterized by having, in the plane of the reed, a greater flexural modulus in a direction parallel to the first set of strands than in a direction parallel to the second set of strands. By orienting the reed such that the first set of strands are flexed in a cantilever-type manner during the operation of the reed, the reed is able to take advantage of the improved mechanical properties resulting from the higher flexural modulus associated with the first set of strands. Because the reed does not flex substantially in the transverse direction to the first set of strands, the lower flexural modulus of the reed in the transverse direction, i.e., in the direction of the second set of strands, is essentially inconsequential.

A significant advantage of this invention is that such a reed is suitable for automotive applications in terms of structural integrity as defined by the reed material's flexural modulus and its fracture toughness. The use of a semicrystalline thermoplastic as the material for the reed provides a reed which is particularly capable of surviving numerous engine cycles without failure. The weave used to form the reinforcing fabric of the reed enhances the mechanical properties of the reed, and more specifically, the flexural modulus of the reed, in one direction. By orienting the reed to flex in this direction, the reed can be formed to be lighter and thinner, resulting in a faster responding reed valve.

Another significant advantage of this invention is that the semicrystalline thermoplastic from which the reed is made enables the reed to be highly resistant to chemical and thermal attack, such as that associated with operating within an internal combustion engine. Semicrystalline thermoplastic materials also exhibit fracture toughness superior to that of conventionally used thermoset materials, promoting long life of the reed within the environment of an automotive internal combustion engine.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein.

DETAILED DESCRIPTION OF THE INVENTION

A polymer composite reed for a reed valve is provided, wherein the reed has improved mechanical properties as a result of its construction and is highly resistant to chemical and thermal attack. The improved mechanical properties of the reed are primarily due to the reed being reinforced with two plies of fabric having a harness satin weave, which provides the reed with a flexural modulus that is substantially greater in one direction of the reed. The chemical and thermal properties are primarily due to the semicrystalline thermoplastic material from which the reed is formed. In addition, the thermoplastic material enhances the fracture toughness of the reed to improve the durability of the reed. As a result, the reed is highly suitable for applications requiring long life under high speed, cyclic loading, such as that found in two-stroke or four-stroke internal combustion engines for the automobile industry.

Figure 1:
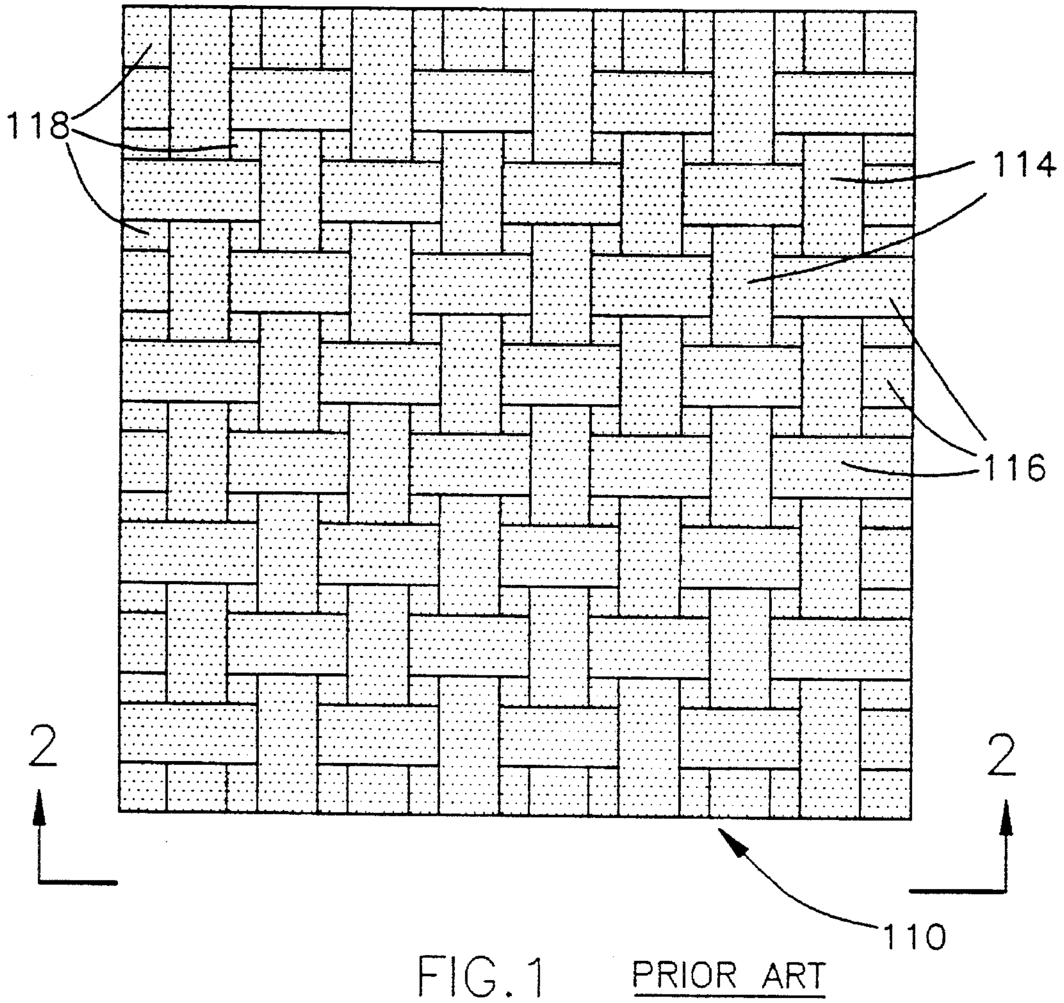
FIG. 1 PRIOR ART
FIG. 1 shows a plan view of a plain weave reed of the type known in the prior art.
Figure 2:
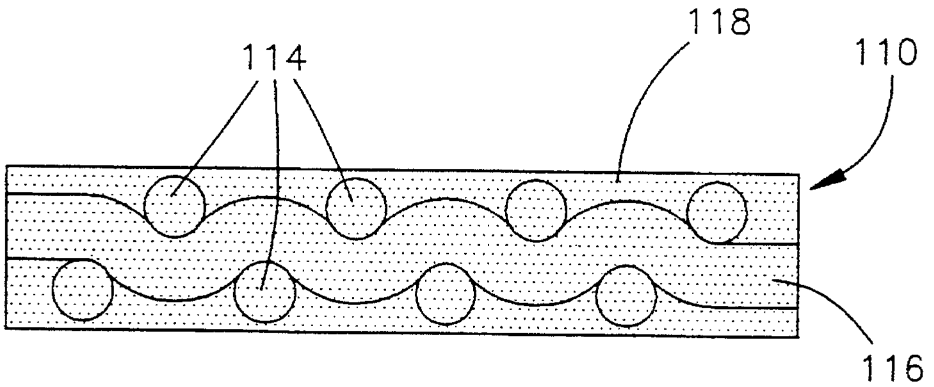
FIG. 2 PRIOR ART
FIG. 2 shows a cross-sectional view taken along line 2—2 of FIG. 1 showing one fabric layer of the plain weave reed.

Illustrated in FIG. 1 is an enlarged portion of a conventional plain weave fabric for a composite polymer reed 110 known in the prior art. Note that FIG. 2 shows a single fabric layer in cross-section, though it is conventional to use between about 2 and about 6 fabric layers in a conventional composite reed. The reed 110 is generally a thermoset material formed around a plain weave fabric which serves as a reinforcement. The fabric consists of a first set of strands 114 running in a "warp" direction and a second set of strands 116 running perpendicular to the warp strands 114 in a "weft" direction. The nomenclature used here is conventional in the art, and generally identifies the orientation of the strands relative to the weaving process. The warp strands 114 are those that, during the weaving of the fabric, are fed continuously through the weaving machine in the direction of the machine's rotation. The weft strands 116 run transverse to the warp strands 114 and may be considered to extend widthwise across the fabric as it is being made.

As illustrated, the plain weave fabric is characterized by the warp and weft strands 114 and 116 being woven together such that the strands 114 and 116 successively pass over and under each other, one strand at a time, in an alternating fashion. When manufactured with a balanced construction, wherein the number and size of the warp strands 114 are approximately the same as that of the weft strands 116, the reed 110 will have approximately equal mechanical properties in both directions of the fabric, i.e., in the directions parallel to the warp and weft strands 114 and 116.

The typical material from which the strands 114 and 116 are made is a fiberglass yarn. Most often, the specific fiberglass formulation used is electrical, or "E", glass. E-glass is characterized by a composition having about 52 to about 56 weight percent silicon dioxide, about 16 to about 25 weight percent calcium dioxide, about 12 to about 16 weight percent aluminum oxide, about 8 to about 13 weight percent boron oxide, up to about 1 weight percent sodium and potassium oxide, and up to about 6 weight percent magnesium oxide. Alternatively, high strength, or "S" glass yarns are also available, but are typically unnecessary for reed valve applications. S-glass is characterized by a composition having about 64 to about 66 weight percent silicon dioxide, about 24 to about 26 weight percent aluminum oxide, and about 9 to about 11 weight percent magnesium oxide.

Each strand 114 and 116 contains hundreds of individual fiberglass filaments which are twisted or plied together. The above is conventional, and therefore well known, in the art. Accordingly, the type of yarn, the number of individual filaments, and the filament diameter are factors which are conventionally considered when making a reinforcing fabric for a reed 110, and are not the focus of this invention.

In the conventional reed 110, a thermoset material, such as an epoxy, serves as the matrix material 118 in which the fabric is encased. The matrix material 118 must be sufficiently rigid and strong to contribute these necessary properties to the reed 110. In addition, to be suitable for automotive internal combustion engines, the matrix material 118 must be able to withstand the high temperatures and the chemically hostile conditions associated with the environment of a internal combustion engine. The thermoset materials conventionally used in the prior art are not sufficiently resistant to chemical and thermal attack for automotive applications. In addition, thermoset materials have mechanical properties, such as strength and dimensional stability, which are generally sufficient for such applications as small two-stroke engines for motorcycles and chain saws. However, thermoset materials are inferior to thermoplastic materials in terms of fracture toughness. Accordingly, thermoset materials are less suitable for applications which demand a longer service life, such as that for engines in the automobile industry.

Figure 3:
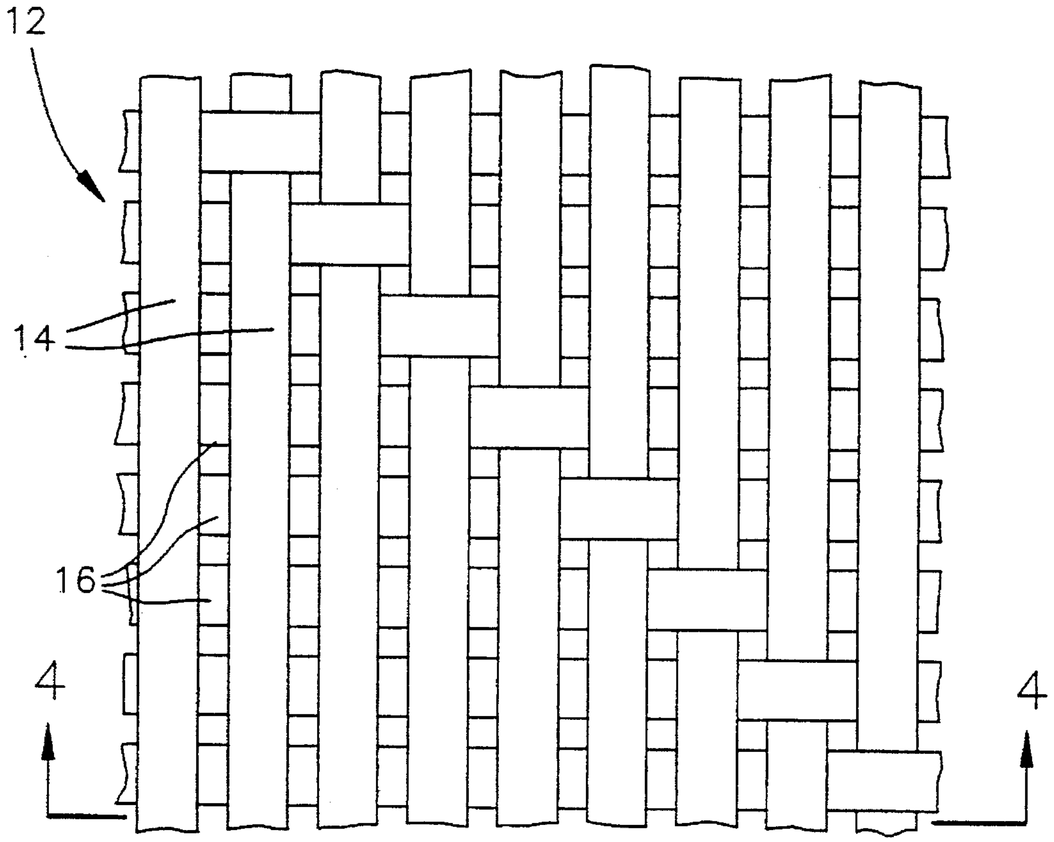
FIG. 3 shows a plan view of an eight harness satin weave fabric in accordance with this invention.
Figure 4:
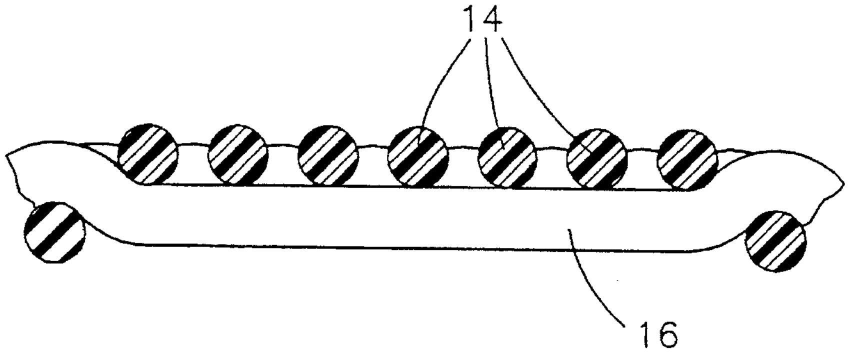
FIG. 4 shows a cross-sectional view taken along line 4—4 of the eight harness satin weave fabric of FIG. 3.
Figure 5:
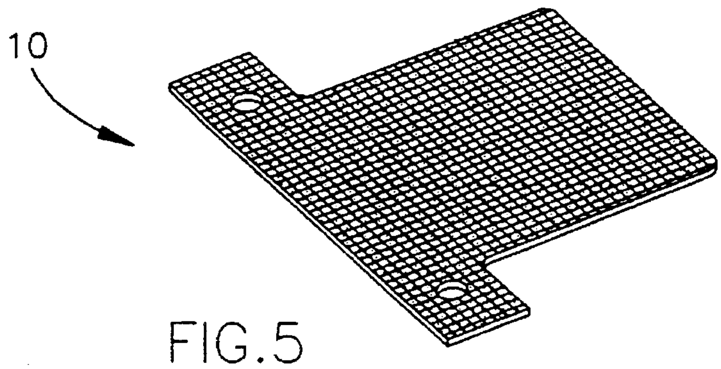
FIG. 5 shows a perspective view of a two-ply reed formed in accordance with this invention.

Referring now to FIGS. 3 and 4, a fabric 12 is shown in accordance with the preferred embodiment of this invention. The reed 10 of this invention is shown in FIG. 5, and incorporates the fabric 12 for reinforcement. Similar to the conventional reed 110, the fabric 12 of this invention has a number of warp strands 14, running in the longitudinal direction of the reed 10, and a number of weft strands, running in a transverse direction of the reed 10.

In contrast to the prior art, and according to a preferred aspect of the present invention, the warp strands 14 pass under one weft strand 16 while passing over several weft strands 16, in a repetitive manner. Such a weave is known in the art as a harness satin weave.

While polymer composite structural components formed from semicrystalline thermoplastic materials reinforced with fabrics having a harness satin weave are known, such components have been limited to structural applications. As those skilled in the art will appreciate, such applications inherently require numerous layers of fabrics and relatively great thicknesses, both of which adversely effect the anisotropic properties necessary to achieve a suitable flexural modulus. Furthermore, the dynamic response, flexural modulus and fatigue characteristics of a composite structure can vary greatly, since such properties are influenced by a combination of the matrix material, the type and amount of reinforcement fabric, and the physical bond between the matrix material and fabric. As such, the suitability of such fabric-reinforced thermoplastic structures for the demanding requirements of a reed's uniquely dynamic application has heretofore been unknown.

The preferred weave illustrated in FIGS. 3 and 4 is an eight harness satin weave, designated as such because each warp strand 14 passes over seven weft strands 16 and under one weft stand 16, in a repetitive manner. However, the weave could foreseeably be altered for particular applications which require lesser or greater mechanical properties, which can be attributed to the type of weave. Accordingly, the teachings of this invention are not specifically limited to an eight harness satin weave. In addition, it is foreseeable that the relative orientation of the warp and weft strands could be modified during weaving of the fibers, so as to be perpendicular to that shown in the accompanying figures, therefore the warp and weft strands would become the weft and warp strands accordingly.

As can be seen in FIG. 3, the eight harness satin weave pattern is continuous over the entire fabric 12. As a result, the surface of the fabric 12 seen in FIG. 3 is visibly dominated by the, warp strands 14. Conversely, the opposite side of the fabric 12 is visibly dominated by the weft strands 16. As one would expect, tensional stresses imposed lengthwise along a strand 14 or 16 are more readily withstood by the strand than stresses imposed transverse to the length of the strand. With respect to the surface seen in FIG. 3, tensional stresses at this surface of the fabric 12 will be more readily sustained if imposed in the direction of the warp strands 14 rather than in the direction of the weft strands 16. In contrast, with respect to the surface opposite that seen in FIG. 3, tensional stresses at this surface will be more readily sustained if imposed in the direction of the weft strands 16 rather than in the direction of the warp strands 14. In effect, a harness satin weave creates an asymmetrical construction in terms of the load-carrying ability of a reed formed therefrom.

In terms of bending stresses, it is well known that the outermost fibers on one side sustain the highest tensional loading and the outermost fibers on the opposite side sustain the highest compressional loading when the composite is bent. As a result, the flexural modulus of a composite beam is primarily determined by the ability of the fibers at the outermost surfaces of the composite beam to withstand tensional loading of the beam. Where the composite beam is composed of long fibers, the flexural modulus of the beam is optimized if the tensional loading in the fibers is imposed along their longitudinal length, as opposed to being imposed transverse to their length.

Figure 6:
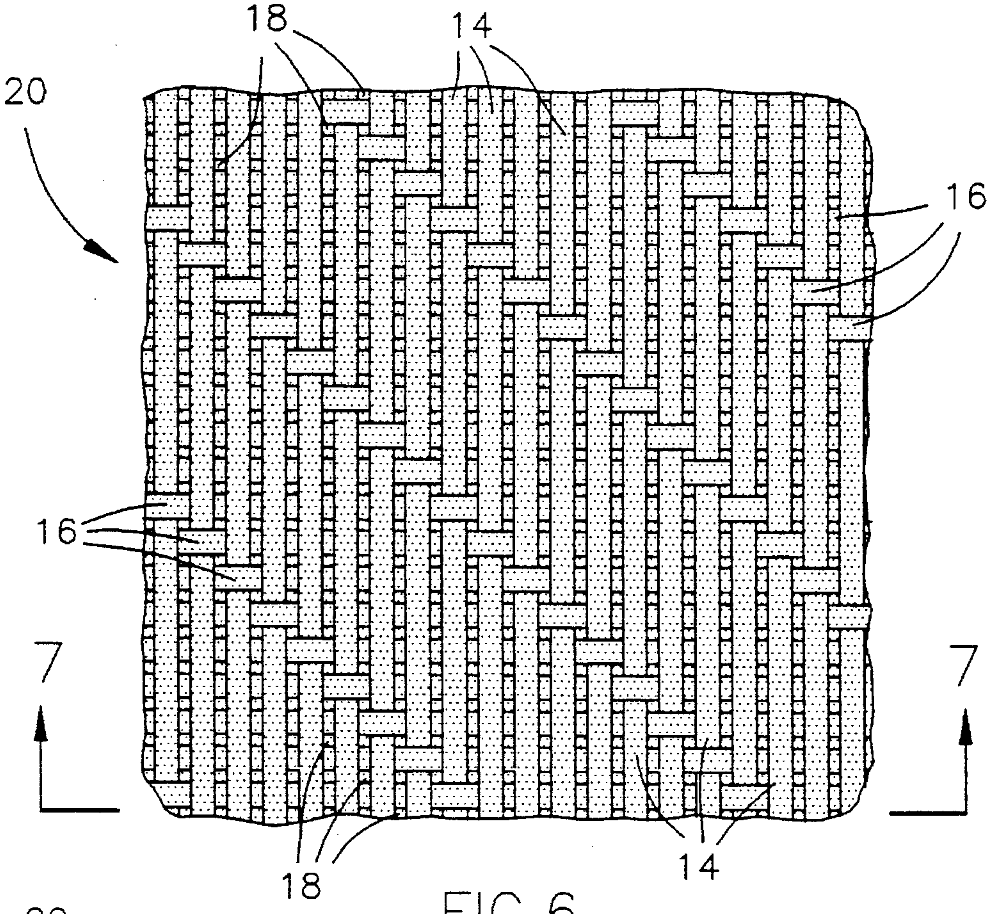
FIG. 6 is a magnified plan view of the reed of FIG. 5.
Figure 7:
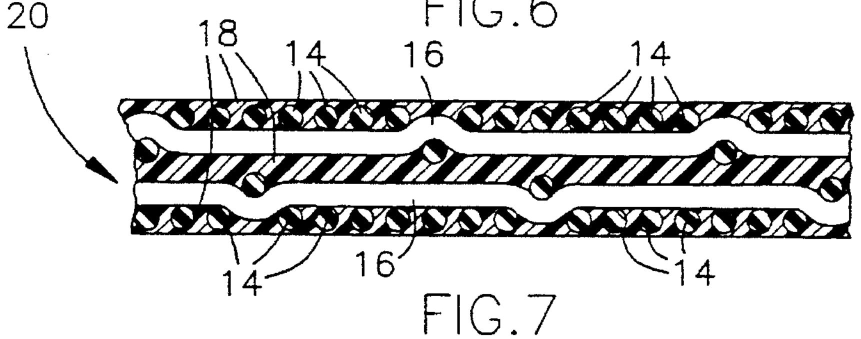
FIG. 7 is a cross-sectional view taken along line 7—7 of FIG. 6.

From the above, the advantage of placing two of the composite woven fabrics 12 back-to-back to provide a two-ply reinforcement to the reed 10 can be appreciated for purposes of optimizing the flexural modulus, and therefore the mechanical properties, of the reed 10 for bending in a particular manner. Specifically, by placing the surfaces of the fabrics 12 dominated by the weft strands 16 against each other and bonding the fabrics 12 together to form a two-ply composite fabric, the surfaces dominated by the warp strands 14 will constitute the outermost fibers of the composite fabric. This orientation is illustrated in FIGS. 6 and 7, which show, in plan and cross-sectional views, respectively, an enlarged fragment 20 of the reed 10 shown in FIG. 5. Tensional stress imposed on the outer fibers of the composite fabric and in the primary direction of the reed 10, i.e., in the: longitudinal direction of the warp strands 14 and transverse to the weft strands 16, are readily withstood by the warp strands 14. This is the condition that occurs when a bending load is imposed on the reed 10 in a manner that imposes a "cantilever" load relative to the warp strands 14, such that the warp strands 14 are under a tensional load. Under these conditions, little stress (theoretically, no stress) will be imposed in the secondary direction of the reed 10, i.e., in the longitudinal direction of the weft strands 16 and the transverse direction of the warp strands 14.

Figure 8:
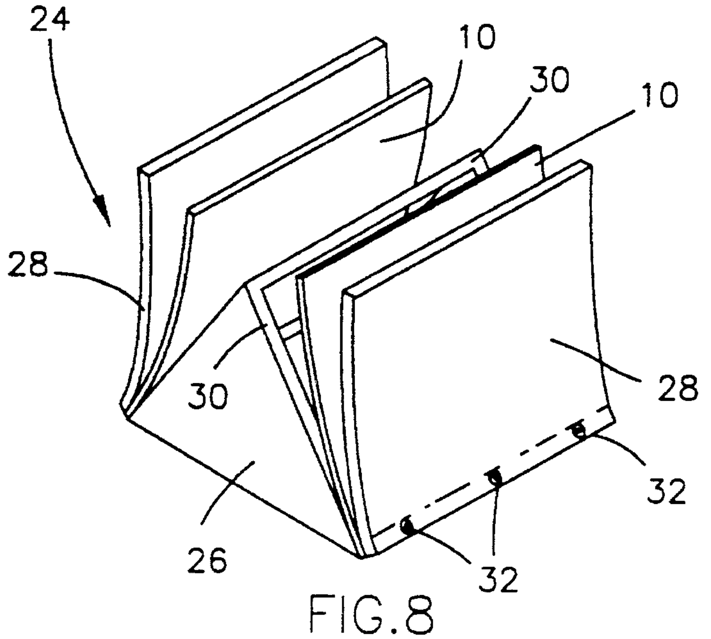
FIG. 8 shows a pair of reeds formed in accordance with this invention and installed within a reed valve.

To take advantage of the physical properties provided by the above orientation, the reed 10 shown in FIG. 5 contains warp strands 14 which are oriented in the longitudinal direction of the reed 10, i.e., parallel to air flow over the reed 10 and transverse to a flange 22 which may conventionally be used to secure the reed 10 to a reed valve, an example of which is illustrated in FIG. 8. As a result, the weft strands 16 are oriented transverse to the longitudinal direction of the reed 10 and parallel to the flange 22. Because the reed 10 is limited to pivoting about the flange 22 during the operation of a reed valve, the warp strands 14 will alternatingly be placed in tension or compression (corresponding to the side of the reed 10 the, warp strands 14 are located), depending on whether the reed 10 is permitting or obstructing the passage of fluid through the reed valve. In contrast, the weft strands 16, located along the neutral axis of the reed 10, will never encounter a significant tensional load under normal operating conditions.

As illustrated by the reed fragment 20 of FIGS. 6 and 7, the reed 10 is primarily formed as a polymer matrix material 18 which is reinforced with the two back-to-back fabrics 12. The preferred matrix material 18 is a semicrystalline thermoplastic material, and more specifically, either poly(aryl)etheretherketone (PEEK), poly(aryl)etherketoneketone (PEKK), or polyphenylene sulfide (PPS). These materials are known in the art and available from various commercial sources. Furthermore, these semicrystalline materials, and particularly the PEEK and PEKK materials, are characterized as exhibiting fracture toughness superior to that of thermoset materials. As a result, the reed 10 is significantly more durable than reeds of the prior art. Because of the automotive applications specifically foreseen for the reed 10 of this invention, durability is a key factor. Typically, a reed valve which is to be used in a two-stroke or four-stroke engine for an automobile must be capable of passing a durability test, which is generally a 100,000 mile minimum requirement in the automobile industry.

The flexural modulus of conventional reeds having the plain weave construction shown in FIG. 1 is typically about 20 to about 28 GPa, while the flexural modulus in the primary direction of the reed 10 of this invention has been found to be in excess of 35 GPa. In comparison, the flexural modulus in the secondary direction of the reed 10 is more typically about 12 GPa, due to the asymmetrical construction of the eight harness satin weave fabric 12. However, as noted above, the weft strands 16 of the reed 10 will not see any significant tensional loads during normal operation of the reed 10. To the contrary, it is the intent of this invention that essentially all of the tensional loading due to the bending of the reed 10 be imposed on the warp strands 14.

FIG. 8 illustrates reeds 10 formed in accordance with this invention and installed in a reed valve 24. As shown, the reeds 10 are mounted between a reed cage 26 and a corresponding pair of reed stops 28, with lower edges of the reeds 10 and reed stops 28 being secured with fasteners 32 to the reed cage 26. During the operation of the reed valve 24, the reeds 10 are required to flex between a closed position in which the reeds 10 seat against a seating area 30, and an open position limited by the reed stops 28. In order to take advantage of the enhanced flexural modulus of the reeds 10, the reeds 10 are oriented so that the primary direction of each reed 10 is parallel to the flow of air through the reed valve 24 and transverse to the bending axis of the reeds 10. As such, tensional stresses are primarily imposed on the dominant outer fibers of the composite fabric which, as illustrated in FIGS. 5 and 6, are the warp strands 14.

Figure 9:
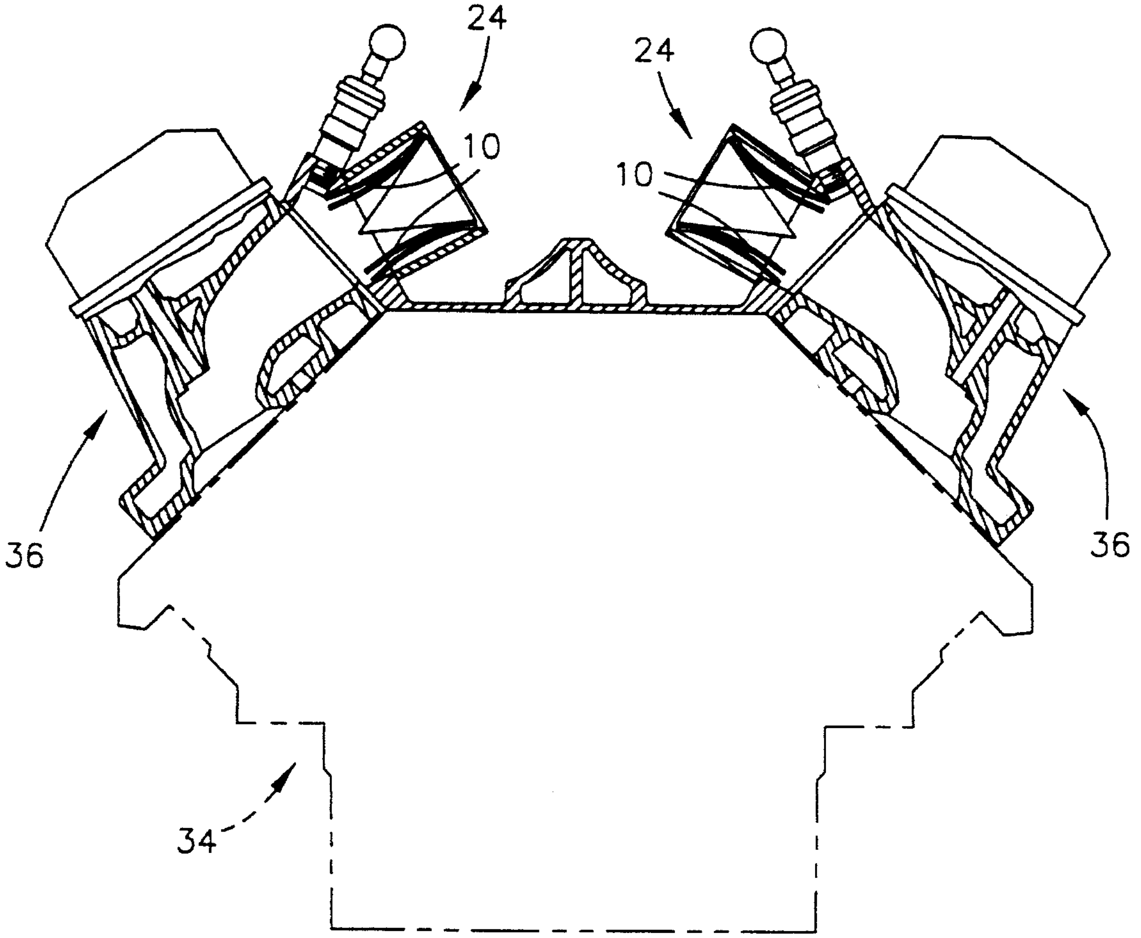
FIG. 9 shows reed valves configured in accordance with FIG. 8 and installed in an internal combustion engine.

FIG. 9 illustrates a suitable manner in which a reed valve 24 can be mounted to each intake manifold 36 of an internal combustion engine 34. While FIGS. 8 and 9 are illustrative of the operating environment of the reed 10 of this invention, various other reed valve configurations and engine applications are foreseeable and within the scope of this invention.

The reed 10 of this invention can be formed by any suitable method which is conventional or otherwise known or practical in the art. Generally, the first step will be to weave the fabrics 12 using known weaving machines according to known processing techniques. The strands 14 and 16 may be of any suitable material, with the previously described E-glass being suitable for most applications. In addition, the number of individual filaments and the diameter of the filaments can be selected according to the specific needs of an application. Satisfactory results have been obtained with strands 14 and 16 being formed front ECDE 75 1/0, which is E-glass continuous filaments, each filament having a diameter of about 6 microns, with about 816 filaments per strand.

The preferred application methods for encasing the fabrics 12 within the thermoplastic matrix 18 include first applying molten thermoplastic directly to the fabrics 12 or providing the thermoplastic material as a fine powder and electrostatically depositing this thermoplastic powder onto the fabric 12. The preferred process is to use known fluidized bed techniques to electrostatically deposit the thermoplastic powder onto the fabric 12. Fluidized bed techniques are preferred in that a more uniform coating; of the thermoplastic material can typically be applied to the fabric 12 under mass production conditions. The fabric 12 is then heated to a temperature above the melt temperature of the thermoplastic material—about 360° C. for the PEEK and PEKK materials and about 290° C. for the PPS materials—for a duration sufficient to adhere the thermoplastic powder to the strands 14 and 16.

Two coated fabrics 12 are then placed back-to-back, as illustrated in FIG. 7, and placed within a suitable mold which is sized to accommodate the fabrics 12 and the desired thickness of the reeds 10 formed from the fabrics 12. A preferred thickness for the reed 10 which is suitable to provide sufficient flexibility and strength is about 0.013 to about 0.020 inch, and more preferably about 0.015 inch.

The fabrics 12 and their thermoplastic coatings are then heated to a temperature of about 350° C. to about 400° C. for the PEEK and PEKK materials, or about 280° C. to about 310° C. for the PPS material, after which the fabrics 12 are pressed under a pressure of about 100 to about 200 psi to melt and distribute the thermoplastic material throughout the fabrics 12 to form the polymer matrix 18 shown in FIG. 7. The duration of the heating and pressing operation will vary with the mass of material being molded, the type of material used for the thermoplastic matrix 18, and the molding temperatures used. Such processing parameters are well within the scope of one skilled in the art.

Reeds 10 can then be die cut to size and shape from the resulting thermoplastic-reinforced fabric. The shape and size of the reed 10 will vary widely with the particular application. Again, such decisions are well within the scope of one skilled in the art. In the embodiment shown in FIG. 5, the reed 10 roughly has a longitudinal (i.e., perpendicular to the flange 22) length of about 2.0 inches and a width of about 1.7 inches.

While the above processing steps will serve as a general guide, other methods to achieve the same results will be apparent to those skilled in the art. Accordingly, the teachings of the present invention are not limited to the particular methods disclosed above which can be used to encase the fabrics 12 within the thermoplastic matrix 18 of the reed 10.

From the above, it is apparent that a significant advantage of the reed 10 made according to this invention is that the reed 10 has both a high flexural modulus and a high fracture toughness. Both of these properties are essential for use in automotive applications where the reed 10 is required to sustain flexing loads over a long service life:, such as where a two-stroke or four-stroke engine is used to power an automobile. Specifically, the harness satin weave adopted by the present invention to form the reinforcing fabric 12 of the reed 10 enhances the flexural modulus in the primary direction of the reed 10. As a result, the mechanical properties of the reed 10 are enhanced in the direction which must endure the highest tensional stresses as the reed 10 bends during its operation.

As a direct result of improving the flexural modulus of the reed 10, the thickness of the reed 10 can be correspondingly reduced to form a lighter and thinner reed 10, thereby enabling the reed 10 to respond more quickly. In the environment of an intake system for an automotive engine, a faster responding reed valve will close more quickly in response to a reversal in the direction of airflow. The more quickly the reed valve closes, the more air is trapped for the engine to consume in combustion, thereby enhancing engine performance.

Another significant advantage of this invention is that the preferred semicrystalline thermoplastics are highly resistant to the hostile chemical and thermal of an internal combustion engine. Specifically, the preferred semicrystalline thermoplastic materials, and in particular the PEEK and PEKK materials, are highly resistant to methanol/gasoline blends. In contrast, a significant shortcoming of the epoxy-reinforced reeds of the prior art was the lack of resistance to such fuel blends.

In addition, the preferred semicrystalline thermoplastic materials are characterized as having fracture toughness which is superior to that of the thermoset materials conventional used for reeds. As a result, the reed 10 is particularly capable of surviving numerous engine cycles without failure. In contrast, similarly-sized reeds formed from thermoset materials will not exhibit comparable durability, and can be expected to fail prior to completing a 100,000 mile durability test typically required in the automobile industry.

It is believed that the teachings of this invention could be extended to numerous applications outside of the automotive industry. Practically speaking, the teachings of this invention could be employed to produce a thin sheet, wafer, disc or board which must be flexural strong and rigid to perform satisfactorily.

Therefore, while our invention has been described in terms of a preferred embodiment, it is apparent that other forms could be adopted by one skilled in the art; for example, by modifying the processing parameters such as the temperatures or durations employed; or by substituting appropriate materials for the strands 14 and 16; by increasing the number of fabrics 12 encased in the thermoplastic matrix 18; or by utilizing different numbered harness satin weaves, such as a seven or nine harness satin weave or even greater extremes such as three to twelve harness satin weaves. Accordingly, the scope of our invention is to be limited only by the following claims.

The embodiments of the invention in which an exclusive property or privilege is claimed are defined as follows:

1. A reed valve having a reed for regulating flow through said reed valve, said reed comprising:

a semicrystalline thermoplastic matrix material selected from the group consisting of poly(aryl)etheretherketone, poly(aryl)etherketoneketone, and polyphenylene sulfide; and at least two fabrics reinforcing said matrix material such that the flexural modulus of said reed is greater in one direction than in a transverse direction, a first fabric of said at least two fabrics being substantially parallel to a second fabric of said at least two fabrics, each of said first and second fabrics having a first surface and an oppositely disposed second surface, said first and second fabrics being oriented relative to each other such that said first surface of said first fabric is oppositely disposed from said first surface of said second fabric and such that said second surface of said first fabric faces said second surface of said second fabric, each of said first and second fabrics comprising:

a first plurality of strands extending substantially parallel to each other and to said one direction; and a second plurality of strands extending transverse to said first plurality of strands;

wherein said first and second plurality of strands are interwoven with each other such that, viewed from said first surfaces of said first and second fabrics, each strand of said first plurality of strands first passes over a first predetermined number of said second plurality of strands and then under a second predetermined number of said second plurality of strands, and wherein said first predetermined number is greater than said second predetermined number, such that more of said first plurality of strands are exposed at said first surfaces of said first and second fabrics than said second plurality of strands, and such that more of said second plurality of strands are exposed at said second surfaces of said first and second fabrics than said first plurality of strands;

whereby said reed is characterized by having, in the plane of said reed, a greater flexural modulus in a direction parallel to said first plurality of strands than in a direction parallel to said second plurality of strands.

2. A reed valve as recited in claim 1 wherein said second plurality of strands are substantially perpendicular to said first plurality of strands.

3. A reed valve as recited in claim 1 wherein said first predetermined number is seven and said second predetermined number is one.

4. A reed valve as recited in claim 1 wherein said reed has an edge secured to said reed valve, said first plurality of strands being substantially perpendicular to said edge and said second plurality of strands being substantially parallel to said edge.

5. A reed valve as recited in claim 1 wherein said first fabric and said second fabric are substantially encased in said matrix material.

* * * * *